Patented Aug. 17, 1954

2,686,765

UNITED STATES PATENT OFFICE 2,686,765

OLEORESINOUS VARNISHES CONTAINING FATTY ACID RADICALS COPOLYMERIZED WITH MONOVINYL COMPOUND IN PRESENCE OF COMPOUND CONTAINING AT LEAST ONE BUT NOT MORE THAN TWO HEMIQUINOID GROUPS

James A. Arvin, Homewood, Ill., assignor to The Sherwin-Williams Company, Cleveland, Ohio, a corporation of Ohio No Drawing. Application February 21, 1950, Serial No. 145,587

10 Claims. (Cl. 260—22)

This invention is concerned with the formation of copolymers of vinyl compounds and the essentially non-conjugated drying oil fatty acids, either alone, or as combined in the natural state as a glyceride, or as altered by processing into more complex esters of the drying oil fatty acids with polyhydric alcohols to form synthetic oils, or further as combined with poly-basic acids and polyhydric alcohols to form what is termed in the art as drying oil modified alkyd resins. More particularly, this invention relates to the copolymerization of said drying oil compositions with styrene in the presence of catalytic amounts of a quinone as a catalyst for the reaction, without the necessity of solvents or other reactants or carriers therefor.

The present invention is particularly concerned with a method of manufacture of coating compositions containing copolymers of styrene and drying oil acid radical containing components characterized by their transparency, mineral spirits tolerance and enhanced drying qualities.

It is to be particularly emphasized that in the procedure and the products hereinafter described the drying oil fatty acids, either alone or in their combined forms are essentially unbodied, and as to that particular structural part of the composition there is little cross linkage between the fatty acid units. In the case of the fatty acids and the drying oils it can be said that they are essentially monomeric, whereas in the oil modified alkyd type resinous product they are, of course, polymeric in nature, but linking is predominantly between the polybasic acid-polyhydric alcohol portion of the polymer rather than between adjacent drying oil fatty acid chains. Blown oils are outside the scope of the products and processes here contemplated. Blown oils generally are unsuited for the manufacture of alkyd varnishes because of the rapid discoloration of the product during the cook and are not essential to the resultant copolymerization with styrene obtained by the method herein disclosed. Solvent cooking of the synthetic oils or of the oil modified alkyds is not essential to the benefits of the process, although solvent cooking may be utilized if it is so desired.

The use of vinyl polymers has been indicated as a coating material early as in United States Patent Number 1,241,738, where polymerized vinyl esters were physically mixed with oils such as castor oil to produce coatings. It is recognized that useful interpolymers or copolymers of processed non-conjugated and other conjugated drying oils with styrene have heretofore been prepared. So far as is known none of the prior art describes a method or a product wherein the oil modifying portion of the composition is predominantly a seed-oil drying type fatty oil or acid and which is, before conjunction with the vinyl compound, essentially monomeric, unoxidized and non-conjugated.

The use of the physically intermixed vinyl polymers castor oil coatings indicated in United States Patent Number 1,241,738 has been superseded by actual chemical bonding between processed oils and vinyl compounds. Many proposals have been made for chemical combinations of vinyl compounds and fatty oils and in those cases wherein it has been possible to copolymerize fatty oils and vinyl compounds, the formation of new compounds has been attested by changes in the physical properties of the new product proving that mere mixtures were not the result.

Eibner et al, in United States Patent Number 1,934,297 disclose the polymerization of monomeric vinyl esters with an unsaturated oil which had previously been partially polymerized, and in a later patent, United States Patent Number 1,956,551, to the same patentees, the combination of such polymerized materials with cellulose is claimed.

Lawson et al, United States Patent Number 1,975,959, allege that the copolymerization of linseed oil with styrene is feasible in the presence of a mutual solvent therefor. However, only small amounts of linseed oil were indicated to be operable in the method, and a mutual inert solvent was necessary.

Later, Jordan, United States Patent Number 2,054,019, indicates similar requirements for the copolymerization of drying oils and teaches the formation in the presence of peroxide type catalysts of a copolymer with vinyl compounds and a boiled linseed oil fraction separated by means of butyl alcohol, said fraction being insoluble in butyl alcohol.

Flint and Rothrock, United States Patent Number 2,225,534, copolymerize a conjugated drying oil varnish of extreme oil length in the presence of a mutual solvent, or in cases where a solvent is not used, a large excess of the vinyl monomer is found necessary. They warn, however, of difficulties of premature gelation before the reaction proceeds to a suitable end point. The term "frosting oil" is used, which indicates a conjugated oil such as China-wood oil. Non-conjugated oils are not frosting oils.

Whiting, United States Patent Number 2,374,316, describes a resin compatible with conjugated drying oils made by copolymerizing an oil soluble phenol-aldehyde resin with styrene, and indicates that drying and semi-drying oils may be present, but teaches that such additions prevent long chain polymers.

Flint and Rothrock, United States Patent Number 2,276,176, disclose the formation of a coating agent by copolymerization of vinyl compounds with a varnish derived from a conjugated oil in the presence of a mutual solvent.

Gehart, United States Patent Number 2,320,724 and Sorensen, United States Patent Number 2,343,483, find that interaction between vinyl compounds and drying oils is possible through the chemical addition of maleic anhydride or its derivatives to the oil as a prior step in forming oil-styrene interpolymers.

Mighton, United States Patent Number 2,346,858, discloses a vinyl interpolymer with a conjugated oil, an acid similar to maleic acid and the esters and amides of such acids.

Dunlap, United States Patent Number 2,382,212, employs an oxidized non-conjugated drying oil with vinyl compounds to form copolymers in the presence of catalytic amounts of boron trifluoride, sulfuric acid, or toluene sulfonic acid.

In United States Patent Number 2,382,213, Dunlap states, "In order to obtain copolymerization between the non-conjugated drying oil and the vinyl compound some degree of oxidation of the drying oil is necessary . . . in order to obtain a suitable copolymer, the oil should be oxidized until a fairly viscous liquid is developed."

Wakeford and Hewitt, United States Patent Number 2,392,710, propose the blending of a partially polymerized conjugated oil with equal parts or less of a partially polymerized non-conjugated oil prior to copolymerization with styrene.

While it is recognized that useful interpolymers of processed, non-conjugated, and other conjugated drying oils with vinyl compounds may have heretofore been prepared, it has been the experience of those skilled in the art that a predominantly non-conjugated drying oil does not produce a homogeneous reaction product with styrene by any of the above identified methods.

The broad object of this invention is to provide a method for producing and a product comprising the interpolymerization of a monomeric vinyl compound and a monomeric unsaturated fatty acid group at elevated temperature by means of a catalytic quantity of an aromatic compound containing a quinoid group.

A general object of this invention is to provide a new and useful homogeneous composition through copolymerization of a vinyl compound and polyesters of a mixture of substantially unsaturated fatty acids, the major portion or all of which acids are non-conjugated.

Another object is to provide a method of reacting an aromatic vinyl compound with a fatty radical obtained from a non-conjugated, unsaturated fatty oil to produce new and useful copolymers.

One specific object is to effect copolymerization between styrene and a non-conjugated, unsaturated drying oil fatty acid.

Another specific object is to effect copolymerization between styrene and a polyhydric alcohol ester of a non-conjugated, unsaturated drying oil fatty acid.

Another specific object is to effect copolymerization between styrene and an essentially non-conjugated, unsaturated fatty oil modified alkyd resinous vehicle.

A still further object is to provide a new and improved method for the copolymerization of styrene with linseed oil to form new coating compositions.

An additional object is to provide a new and improved method for the copolymerization of a soya bean oil modified alkyd resin with styrene.

Many other specific objectives are inherent in the disclosure and will become apparent upon reading the balance of the specification in conjunction with the illustrative examples.

As a result of the accomplishment of the foregoing objectives, copolymers have been made in accordance with the invention which are useful as clear coating agents, and as basic raw materials in the formulation of oil modified natural and synthetic resin varnishes, including alkyd and phenolic types. Vehicles made from the disclosed copolymers can be pigmented in various known ways to formulate interior and exterior protective and decorative coatings, and it is apparent that the copolymer oils might also be adapted to various allied fields of usefulness among which are printing inks, linoleum, emulsified oil products and adhesives.

The terms "copolymer" and "interpolymer" are herein employed interchangeably. By use of the term "copolymer" is meant the polymerization product of two or more substances at the same time to yield a complex product having properties different from either material polymerized by itself. While it is intended not to be limited by theory, it is believed that the interpolymerization of the oil and the styrene progresses at a sufficient rate to provide a common or mutual solvent for other polymer molecules which may be preponderantly styrene polymers or preponderantly oil polymers. The terms "copolymer" and "interpolymer" are meant to indicate the complex high molecular weight materials which result from interpolymerization between unlike molecules and homopolymerization between like molecules, reactions leading to these ends occurring simultaneously when two reactive compounds of the nature of those herein proposed are conditioned by proper temperatures, pressures and catalysts to react with each other and together to form clear single phase homogeneous reaction products. The terms should not be understood to infer complete reaction in specific ratios between the individual reactant molecules to form repeated congruent geometric structures.

In the practice of the invention, it has been found that useful copolymers, preferably containing from 5% to 50% of styrene, can be produced from non-conjugated, unsaturated fatty oil acids, fatty oils, or fatty oil acid polyesters, including the drying oil fatty radical of the type obtained from the seeds of soya bean, flax, chia, perilla, safflower and sunflower plants, the fish oils including menhaden and sardine, and other non-conjugated vegetable and animal oils having iodine values between about 120 to 200. Dibasic acids may also be employed to modify the above polyesters and include malonic, succinic, glutaric, adipic, pimelic, suberic, azelaic, sebacic and phthalic, the preferred dibasic acid being phthalic anhydride. Excess acidity upon modification of the polyesters with the above dibasic acids may be corrected by further esterification with polyhydric alcohols including glycol, glycerine, pentaerythritol, dipentaerythritol, polypentaerythritol, mannitol, sorbitol and other similar polyhydric alcohols. The useful interpolymers are produced by conjunction of the compounds suggested above with styrene and its homologues in the presence of catalytic amounts of a quinone at temperatures ranging between 325 degrees to 550 degrees F., and preferably between 400 degrees F. and 450 degrees F.

In some instances the percentage of styrene can be increased above 50% of the polymer by increasing the reaction temperature. Increasing the styrene content is comparable to increasing the resin content in a varnish, for as the styrene component is increased, the dried films resulting from the polymer become increasingly hard and brittle. A practical preferred limitation in maximum styrene content has been indicated when the percentage of styrene in the oil-styrene complex is in the neighborhood of 50%. Percentages of styrene lower than 15% (e. g., 5% to 15% may be achieved by the disclosed process, but such products as result dry slowly and find their widest usage as plasticizers where a fast drying rate is not essential. Hence, the preferred range of styrene in combination with a drying oil has been found to lie between 5% and 50% by weight based on the final copolymer formed. In oil-modified alkyd type condensation products the weight ratio of the fatty acid component to phthalic anhydride, while not critical from an academic view, should not be appreciably less than 10:7. The upper limit is partially dependent upon the amount of styrene to be reacted with the alkyd varnish resin, but is not limited inasmuch as one can make the oil length of the alkyd as long in oil as he might find expedient to achieve qualities in the final product necessary to his requirements.

Preferred alkyd type compositions among those so far found useful have been formed with the ratio of the reactants in the neighborhood of one part oil, 0.5 part phthalic anhydride and one part styrene. It is obvious, however, that considerable variation from this ratio is possible and useful to accomplish various end results.

Partial glyceride oil blends useful in the formation of alkyd resins can be made in situ for the purposes herein with China-wood oil and another polyester derived from soya oil or soya fatty acids, linseed or other drying oil in the ratio of not more than 1:3 parts by weight by heating the oils together with a specified amount of polyhydric alcohol (e. g. glycerine, pentaerythritol) in the presence of a calcium acetate catalyst to a temperature of about 460 degrees F., for an hour more or less. By such a procedure mixed partial esters of the alcohol may be formed as an initial phase or step in the production of alkyd type vehicles. The practice of so doing is well known in the art and is a commonplace industrial operation.

Blending and heating in the presence of the catalyst allows an ester interchange and alcoholysis to occur in the reaction mixture. After the ester interchange and alcoholysis phthalic anhydride is added and further esterification occurs to produce the alkyd resin. After the alkyd resin has been formed it is copolymerized with styrene under the catalytic influence of a quinone dispersed throughout the hot, newly-formed polyester condensation product.

Alkyd resins may also be formed by simultaneous reaction of fatty acids, glycerine or other polyhydric alcohol and phthalic anhydride prior to copolymerization with styrene.

While styrene is the preferred vinyl compound, mixtures of styrene and alpha methyl styrene have been used successfully. Alpha methyl styrene alone has been found too unreactive for practical use; consequently, it is blended with styrene for the purpose of the invention. While as much as 30% of the total styrene may be alpha methyl styrene, 5% to 10% is the usual amount. The higher the alpha methyl styrene content of the styrene added as a reactant, the less the resulting coating composition will resist the action of aliphatic solvents such as gasoline.

Among the other suitable vinyl compounds are the vinyl esters, halides and cyanides, such as, for instance, vinyl chloride, vinyl acetate, vinyl butyrate and vinyl propionate, the acrylic acid esters, and acrylonitrile. The vinyl compounds employed as starting materials are characterized by a single vinyl

group which may be attached to a carbon atom in an aromatic or an aliphatic group.

If styrene is employed, it should be either freshly distilled to remove polymerization inhibitors just before use or certain commercially available styrenes should be selected wherein an inhibitor is added (e. g. paratertiary butyl catechol), which does not interfere with the reactivity of the styrene within the temperature range of the reaction. When the monomeric styrene obtained contains such inhibitors, the styrene can be used without distillation. Styrene stabilized in this manner is preferred.

The unsaturated fatty acids which form an essential part of the compound or complex of the invention embrace a number of unsaturated oils and acids containing a plurality of acyclic carbon to carbon double bonds. A non-conjugated fatty oil (composed chiefly of glycerides of fatty acids) can be used as the sole oil constituent. Alternatively, the oil or fatty acid can be a composite oil formed from non-conjugated oils and a minor proportion of a conjugated oil (e. g., soya bean oil or soya fatty acid polyesters and a maximum of about 25% to 30% of conjugated fatty radical from China-wood oil, oiticica, or dehydrated castor oil), the conjugated oil increasing the reactivity of the interester oil to a maximum level of reactivity without premature gelation before interpolymerization occurs. Such a useful oil blend can be made with China-wood oil and another polyester derived from soya oil or soya fatty acids, linseed or other drying oil in the ratio of not more than 1:3 parts by weight by heating the oils together in the presence of a calcium acetate catalyst to a temperature of about 460 degrees F., for an hour.

Pre-blending and pre-heating in the presence of the catalyst allows an ester interchange to occur in the blended polyesters. After the ester interchange, the new polyester is copolymerized with styrene under the catalytic influence of a quinone dispersed throughout the newly formed interester.

Alcoholysis or ester interchange, or interesterification reactions, can be useful in forming mixed fatty acid polyester oils allowing a wide latitude in oil selection. For example, pentaerythritol and soya bean oil in the proper proportion may be heated together in the presence of a catalyst to form the many various glycerides and partial esters of pentaerythritol. China wood oil or other oil fatty acids equivalent to the free hydroxyl groups in the mixture can then be added, and through esterification an essentially neutral blend of a mixed fatty acid glycerine ester and a mixed fatty acid pentaerythritol ester copolymerizable with styrene under the conditions herein disclosed will form.

In the following table, the unsaturated fatty acids common in paint and varnish makers' oils are classified according to the type and extent of unsaturation which they possess.

| Fatty Acid | Type | Kind and Degree of Unsaturation |
|---|---|---|
| Oleic | "A" | One double bond. |
| Linoleic | "B" | Two double bonds isolate or non-conjugate in position. |
| Linolenic | "C" | Triple double bonds non-conjugate or isolate in position. |
| Eleostearic Licanic | "D" | Triple double bonds conjugate in position. |

In discussing the fatty acids and oils which may be used alone or combined to form an oil-modified alkyd varnish for use in copolymerization with styrene, it has been found that a straight soya bean oil has about the minimum degree of reactivity necessary to produce clear, homogeneous copolymers according to the method disclosed. Soya bean oil contains approximately 33½% of "A" acids, 52½% of "B" acids and about 2¼% of "C" type acids, the residual acids being saturated types. None of the described acids are of the conjugated class. Linseed oil also suitable by itself as an acid, as an interester oil, or combined in an alkyd varnish, contains about 20% of "A" acids, about 25% of "B" acids and about 45% of "C" acids. From this data one could conceivably assemble the same fatty acids from other sources to form synthetic compounds as indicated having a reactivity equivalent to linseed or soya oil, as from fatty acids recovered through solvent extraction methods or molecular distillations from animal or vegetable sources.

Conjugated drying oils containing above 70% of fatty acids of the "D" classification have been suitably processed to form alkyd vehicles, but generally speaking are of such a high degree of reactivity that difficulties occur in completion of the alkyd varnish without obtaining impractically high viscosities. Gelation often occurs before the acid value of the desired alkyd has been obtained. Upon attempting further additions—such as herein disclosed—premature gelation occurs. Premature gelation is therefore one of the limiting factors as to the percentage of "D" type acids present as the acid, or in an oil, or polyester, or an alkyd, for formation of homogeneous copolymers.

The occurrence of about 10% or less of saturated acids (e. g. palmitic and stearic acids) in oils from oil bearing seeds is well known and the use in part of these or other saturated acids is permissible provided that the proportions are sufficiently limited so as not to impair the reactive character of the drying oil acid or polyester. So long as the percentages of saturated oils do not exceed the proportion carried in naturally from the vegetable drying oils, no difficulty is to be anticipated, and it is to be understood that the remainder of the oils present and not described in the oil analyses herein reported may be, but it is not required that they be, saturated varieties of seed oils.

As the percentage of "C" type fatty acids in the drying oil component of the projected copolymer increases, less "D" type acids should be used to insure against premature gelation due to too high a reactivity level.

Formulation of the mixed polyester allows considerable latitude in both the kind and amount of fatty acid used. Synthetic oils may be produced through use of soya bean oil or soya fatty acids, or commercially available fatty acids such as Armour & Company's Neofat 3–R, which contains about 60% of linoleic acid by forming esters with glycerol or other polyhydric alcohol.

It becomes apparent that between straight refined soya bean oil defining a minimum reactivity mixed fatty acid polyester, or alkyd, and a mixed polyester of principally linseed fatty acids containing a proportion of China-wood oil fatty acids which defines a maximum reactivity mixed fatty acid, polyester or alkyd, there are innumerable combinations of fatty acids of varying degrees and kinds of unsaturation that can be selected to form synthetic drying oils useful in forming new and novel interploymers or copolymers with styrene and its homologues by the methods herein described and illustrated. Drying and semi-drying oils illustrated by perilla, chia, safflower, sunflower, etc. may be used as the glycerides, or they may be "split" to provide usable unsaturated fatty acids alone, or as a part of the mixed polyesters hereinbefore described.

It is further apparent that the polyhydric alcohol forming a part of the synthetic oil or mixed fatty acid polyester or oil modified alkyd can be selected from a wide variety of polyhydroxy compounds well known in resin formulation, among the most commonly used of which are glycerine, glycol, pentaerythritol, polypentaerythritol, sorbitol, mannitol, polyallyl alcohol and others.

The mixed fatty acid polyesters may be formed either by direct esterification, or indirectly by ester interchange reactions with the natural or synthetic triglyceride oils.

It is also apparent that the selection of the polyhydric alcohol forming a part of the polyester or the alkyd may have some effect upon the reactivity of the resultant product, and that modifications of the proportions will be in order depending upon the alcohol selected, whether an alkyd resin is first formed, and if so, the amount of phthalic anhydride used, and the particular qualities desired in the resultant styrene-oil copolymer.

It is useful in certain applications to first copolymerize the aromatic vinyl compound with the mixed fatty acids through the quinone catalyst prior to esterification with a polyhydric alcohol, or prior to the manufacture of an alkyd resin. However, it is generally preferable to form the fatty oil complex polyesters prior to the conjunction reaction with styrene.

A preferred method of carrying out the invention consists of heating the fatty acid, the polyester oil, or the drying oil modified alkyd to a temperature within the disclosed range in the presence of catalytic quantities of a quinone, and while mechanically agitating the hot catalyzed mass, bleeding into it styrene or a blend of styrene and alpha methyl styrene gradually. Following the addition of the monomer, the reaction mixture may be treated in various ways to complete the reaction and to free the product of unreacted monomers. At any desired stage unreacted monomers may be removed by blowing the reaction mass with an inert gas such as carbon dioxide or nitrogen, or by steam distilling, or by distillation at reduced pressures.

It will be noted that the interpolymerization reaction is accomplished at atmospheric pressure, although other pressures may be employed from sub- to superatmospheric with more or less advantage, at the expense of unnecessary complication. Reaction at atmospheric pressure has been found quite satisfactory.

While the temperature can be varied within a not too critical range, there are indicated limits wherein the operation is most successful, and temperatures selected within that range are best varied according to other variable factors heretofore discussed.

With linseed oil, the interpolymerization cannot be accomplished at less than 325 degrees F. to obtain clear, homogeneous products. At temperatures greater than 450 degrees F., the resulting interpolymers tend to dry somewhat slowly, and 550 degrees F. seems to be the maximum temperature above which drying type copolymers are not formed. Products in the top temperature range are suitable for use in the field of plasticizers. While temperatures of greater than 450 degrees F. can be used in some cases advantageously, a range of from 400 degrees F. to 450 degrees F. is preferred for oils comparable with linseed oil as to the fatty acid components. When the fatty acids or oils so used are comparable with a straight soya bean oil, the preferred minimum temperature limit is about 400 degrees F. As the "D" type acids are increased approaching a maximum, the preferred minimum temperature limit may be lowered to as low as 325 degrees F.

The compounds embraced by the broadest generic term covering the catalytic agents useful in the process, e. g., cyclic unsaturated ketones containing at least one but not more than two hemiquinoid groups as the sole reactive centers thereof, include the generic class of quinones plus compounds of the class of which hexachlorophenol is a member. Study of the structure of this compound reveals that it in fact contains at least one hemiquinoid group, but is not a dioxy ring compound as are the quinones. Behavior in the copolymerization reaction herein described reveals that such compounds function similarly to the quinones for the purposes of this process.

By the term "quinone" is meant the generic class of organic cyclic dioxy ring compounds containing six or more carbon atoms in a carbocyclic ring. Compounds of this generic class are able to undergo diene addition reactions and two of the carbon atoms in the carbocyclic ring are attached by double bonds to oxygen atoms. The generic class of quinones contains sub-generic classes which include benzoquinones, napthaquinones, anthraquinones and phenanthraquinones, all of which are effective for the purposes herein disclosed. Retene quinone and other oxidized multiple ring compounds containing quinoid groups are also effective and are meant to be included as operative. Preferred quantities of catalyst are from 0.25% to 2% of the quinoid compound based upon the quantity of drying oil fatty acid present in the total copolymer. While additional quinone may be employed, greater quantities are not essential to the results obtained.

The following products were made in glass equipment in laboratory size batches in which the parts are by weight. Standard ground glass, three-neck glass flasks equipped with condenser, agitator, a separatory funnel for adding the styrene and a perforated glass tube by means of which gases could be directed through the batch, and a thermometer. In forming the alkyd resin the condenser was removed except in those cases where solvent was employed in the cooking. Solvent cooking of the alkyd vehicle is not illustrated but the method is so well known that it has been deemed redundant to illustrate this variant. The equipment noted was used in all except the examples as noted. In all the examples the quantities are given in parts by weight unless otherwise indicated.

*Example I*

Into a vessel as described were added 300 parts of alkali refined linseed oil and 1.5 parts of anthraquinone. The quinone-oil mixture was heated to 480 degrees F. in one hour and 300 parts of styrene contained in a dropping funnel were started into the hot oil and in an additional 20 minutes the temperature of the batch was taken to 550 degrees F. and the dropwise addition of the styrene continued at that temperature for 15 hours. After all the styrene had been added, the temperature was held at 550 degrees F. for an additional half hour blowing with $CO_2$ and the batch was completed. A yield of 560 parts of a clear vehicle having a viscosity of 4' 55" (as determined with a Gardner-Holdt tube) was obtained. The acid value was 5–6, and there was no cure below 3 minutes upon test.

*Example II*

The above run was duplicated except that 200 parts of styrene and 100 parts of alpha methyl styrene were blended in substitution for the straight styrene. The time of addition was slightly greater, but the characteristics of the resultant copolymer were practically identical to Example I.

*Example III*

As in Example I, except chloranil was substituted for the anthraquinone. Time of addition was 14 hours and 20 minutes. Viscosity was 8'-40" in Gardner-Holdt tube. Acid value was 5.4, and the cure was greater than 3 minutes.

*Example IV*

As in Example I, except retenequinone was substituted for the quinone of Example I. Time of addition was 20 hours. Viscosity of product was 7'-20". Acid value was 4.7. Cure was greater than 3 minutes. A similar run was made using beta-chloro-anthraquinone with comparable result.

*Example V*

Into equipment similar to that described were weighed 1250 parts of alkali refined linseed oil and 6.25 parts of hexa-chlorophenol, a compound characterized by the presence of a quinoid group, as catalyst. The catalyzed oil was taken to 420 degrees F. and 1250 parts of styrene were started into the batch dropwise. During the period of addition of the styrene, the temperature was allowed to climb to 550 degrees F. and after all the styrene had been added the copolymer formed was blown with $CO_2$ for 30 minutes to remove any low molecular weight products present. Total time of cook was 18½ hours. Product had a viscosity of 7 minutes-45 seconds in a Gardner-Holdt tube, a cure greater than 3 minutes, acid value of 3 and iodine value of 64.

*Example VI*

Into equipment as described following the procedure of Example I, 1250 parts of alkali refined soya bean oil and 6.25 parts of anthraquinone were combined. Dropwise, 1250 parts of styrene were added. The product had a viscosity of 2'-37'' on a Gardner-Holdt tube and was clear. As a separate reaction 1000 parts of the resultant copolymer were combined with 116 parts of glycerine and 269 parts of phthalic anhydride to form a soya-styrene modified alkyd which in a .003'' film, in the presence of 0.5% lead and 0.05% cobalt (as naphthenates) set-to-touch in two hours and 10 minutes.

Example VII

Into a three-neck, round bottom glass flask as previously described, were weighed 600 parts of linseed fatty acids and 1.5 parts of anthraquinone (0.25% based on fatty acids). The oil-quinone blend was heated to 400 degrees F. and 600 parts of styrene were added over a 16 hour period, holding the temperature at this level throughout the addition period. The resultant product was hazy, had a viscosity of X (Gardner-Holdt) and an acid value of 102. Because of the haze, 0.25% of catalyst was deemed minimum that could be used to effect homogeneous products useful in paints and varnishes.

Example VIII

Into equipment similar to that described and following the process of Example VI except that alkali refined linseed oil was substituted for the linseed fatty acids, a product having a Z+ (Gardner-Holdt) viscosity was obtained but was also slightly hazy. This test was further confirmation that 0.25% was about the minimum amount of catalyst necessary for production of copolymer coating compositions. It is to be noted that the product, when used to make an oil-modified alkyd, produced a perfectly clear vehicle of the oil-styrene modified alkyd type.

Example IX

Same as Example VI but 1.5 parts of phenanthraquinone substituted for the anthraquinone. A homogeneous copolymer was obtained having a viscosity of Z+ (Gardner-Holdt) and an acid value of 8.13. An alkyd made from this oil set in 40 minutes, was free to kraft paper in 2 hours and 10 minutes, and free to metal foil in 3½ hours.

Example X

Same as Example I, except the temperature of the cook was reduced to 300 degrees F. The resulting product separated into two distinct layers which established that 300 degrees F. was too low a temperature to obtain satisfactory results.

Example XI

Same as Example I, except the temperature of the cook was reduced to 500 degrees F. The resulting product was compatible and did not separate into distinct phases as did Example X.

Example XII

Into a three-neck flask equipped as described, were added 1700 parts of double distilled soya bean oil type fatty acids (Aliphat 34-B of General Mills) and 2% or 34 parts of anthraquinone. Under a $CO_2$ blanket the fatty acid-catalyst mixture was heated to 350 degrees F. in 1½ hours. While maintaining the temperature at 350 degrees, styrene was started into the hot oil dropwise, and at the end of the 16 hours, all the styrene had been added at 350 degrees F. The heat input was increased and the temperature raised to 425 degrees F. in one hour and held for 45 minutes. The batch was thereafter strongly blown with $CO_2$. A clear copolymer having a viscosity of G, acid value of 92, infinite mineral spirits reduction, and a cure greater than 2 minutes was obtained. A duplicate run using 1-amino-anthraquinone gave a clear but dark product having a low cure value.

Example XIII

Into equipment as described were weighed 510 parts of China-wood oil and 1190 parts of alkali refined soya bean oil. The oil blend was heated to 400 degrees F. and 1.7 parts of calcium acetate added to assist ester interchange. 475 degrees F. was gained in an additional half hour and the batch allowed to cool back to 325 degrees F. meanwhile adding 5.7 parts of anthraquinone as the batch cooled. After an hour and a half the temperature had reached 325 degrees F. and 1475 parts of styrene monomer were started into the oil blend by dropwise addition. After approximately 13 hours at 325 degrees F. all of the styrene had been added. Viscosity of product was $Z_1$–$Z_2$ (Gardner-Holdt), color was 5-6, acid value was 1.1, and had a low cure of 4 seconds. The low cure indicated that this is about the maximum conjugated oil which could be used without gelation of the batch prior to incorporation of all the styrene.

Example XIV

Into equipment similar to that described were weighed 680 parts of soya bean oil, 300 parts of China-wood oil and 283 parts of pentaerythritol. 1 part of litharge was added to aid alcoholysis at 400 degrees F. and the mixture heated to 440 degrees F. and held one hour. 0.35 part of anthraquinone and 573 parts of phthalic anhydride were added and the reaction mass cooled to 350 degrees F. 980 parts of styrene monomer were then added dropwise to the forming alkyd over a 5 hour interval, the mass held at 350 degrees F. for this period. After all the styrene was added the cure value was 38 seconds which was brought down to 11 seconds in about two hours additional cook at 340 degrees F., whereupon, the styrene-oil modified alkyd formed in situ was cut to 60% solids with xylene to yield a clear varnish having a viscosity of E-F (Gardner-Holdt).

Example XV

In a manner similar to that described in Example XIV, a styrenated alkyd was formed, except soya bean oil fatty acids were substituted for the soya oil-China-wood oil blend, and 400 parts of pentaerythritol were used in lieu of 283 parts to accommodate the extra acidity. An alkyd was produced having a viscosity at 50% solids of D (Gardner-Holdt), an acid value of 22.5, and a cure of 8 seconds.

The following Examples A, B and C, illustrate some of the results obtained with reaction components and conditions outside the scope of the invention:

Example A.—Styrene and alkali refined linseed oil at 80% concentration in a solvent A mixture of 1200 parts alkali refined linseed oil, 1200 parts monomeric styrene, and 324 parts xylene was held at 300 degrees F. with agitation while a solution of 24 parts benzoyl peroxide in 276 parts xylene was added gradually in 16½ hours. A clear solution resulted, but a film of the material on evaporation of solvent became opaque and separated into phases.

This example illustrated that under certain conditions a non-conjugated linseed oil did not interpolymerize with styrene.

*Example B.—Styrene and 150 poise heat bodied linseed oil in a solvent*

A mixture of 1050 parts monomeric styrene, 1050 parts 150 poise heat bodied linseed oil, and 1159 parts xylene was held at 300 degrees F. while a solution of 21 parts benzoyl peroxide in 241 parts xylene was added in ten hours. Both solution and dried film were very cloudy.

This example illustrated a method which yielded a cloudy film and solution when the styrene content was as high as 50% of the bodied oil used.

*Example C.—Styrene and alkali refined linseed without solvent or catalyst*

A mixture of 1500 parts monomeric styrene and 1500 parts alkali refined linseed was heated so that reflux was maintained. In 8½ hours the temperature gradually increased until no more styrene monomer refluxed at 450 degrees F. The reaction product was then held six hours at 550 degrees F. The product was very opaque at room temperature and separated into phases on long standing.

This example illustrated a proposed method found unworkable under the conditions shown.

A study of the above specification will bring to the mind of one skilled in the art other variations in composition and procedure, and it is understood that the description and examples, while extensive, are in no wise limiting upon the compositions inherent in the disclosure. Modifications which conform to the spirit of the invention are intended to be included within the scope of the following claims.

It will be observed that the starting materials employed in accordance with this invention for copolymerization with styrene, or a homologue thereof, may be described as "substantially monomeric" when referring to the drying oils or the fatty acids, in that they are not oxidized or polymerized to a viscous state as in the case of bodied oils or oxidized oils.

In the case of the oil modified alkyd vehicle there is polymerization which is believed due to esterification between the polybasic acid-polyhydric alcohol linkages primarily, and very little polymerization between the actual fatty oil radicals of the resultant vehicle. It is believed that there is little actual reaction between the fatty oil molecules during the esterification stage in alkyd manufacture as the temperature is too low. Usually oils are bodied at temperatures between 560 degrees F. to 625 degrees F., which is above the usual range of temperature in alkyd formation. As the styrene is in contact with the fatty oil during esterification, and the reactants are activated by the quinone, copolymerization of the styrene and fatty oil radical is contemporaneous with the esterification reaction in the formation of the alkyd.

In the fatty acid portion of the fatty acid, oil, oil modified alkyd varnish, or synthetic oil ester the major proportion of the acids are unsaturated and contain non-conjugated aliphatic acyclic carbon to carbon double bonds. The major portion of the said acids present in a given composition are characterized by a degree of unsaturation greater than that of oleic acid, but may contain minor proportions of conjugated fatty acids. The invention provides a method of preparing a fluid, homogeneous copolymer of a vinyl compound and (1) a non-conjugated, substantially monomeric fatty oil acid, or (2) the natural and synthetic oils available through esterification of the said acids with polyhydric alcohols, or (3) oil modified alkyd resinous vehicles wherein the oil modified portion is such a substantially monomeric, unoxidized fatty acid or oil as is available from non-conjugated drying or semi-drying oils, e. g., linseed oil, raw or alkali refined, or a raw or alkali refined soya bean oil.

The term "varnish" as used herein is in accordance with the definition stated in Mattiello, volume 3 of "Protective and Decorative Coatings," page 194, which reading is as follows: "A liquid coating material containing no pigment which flows out to a smooth coat when applied and dries to a smooth, glossy, relatively hard, permanent solid when exposed in a thin film to air." On page 195 of the same article an "oleoresinous varnish" is defined to include:

(1) Oil plus
    (a) Natural resin
    (b) Synthetic resin
(2) Oil
(3) Oil modified glycero phthalate The "cure" or "cure value" as herein referred to is the time required for a drop of the copolymer to gel when spread out in a thin film with a pointed metal tool upon a polished metal hot plate maintained at 392 degrees F. Where the time required exceeds two to three minutes, the exact time of gelation is not recorded, but indicated to be greater than two minutes or greater than three minutes.

Viscosities as herein described were determined at a standard temperature of 77 degrees F.

The invention is hereby claimed as follows:

1. The process for producing a copolymer which comprises heating an oleoresinous varnish containing linseed fatty acid radicals to which from 0.25% to 2% of a cyclic unsaturated ketone containing at least one but not more than two hemiquinoid groups as the sole reactive centers thereof has been added, thereafter heating the mass to a temperature within the range of from 400 degrees F. to 450 degrees F. and while agitating the mass and holding the temperature relatively constant, simultaneously adding styrene slowly until a weight of styrene not appreciably more than equivalent to the weight of said varnish has been incorporated to form an oleoresinous copolymer.

2. The process for producing a copolymer which comprises heating an oleoresinous varnish containing soya bean oil fatty acid radicals to which from 0.25% to 2% of a cyclic unsaturated ketone containing at least one but not more than two hemiquinoid groups as the sole reactive centers thereof has been added, thereafter heating the mass to a temperature within the range of from 400 degrees F. to 450 degrees F. and while agitating the mass and holding the temperature relatively constant, simultaneously adding styrene slowly until a weight of styrene not appreciably more than equivalent to the weight of said varnish has been incorporated to form an oleoresinous copolymer.

3. A copolymer of fluid homogeneous character of styrene copolymerized at 325 degrees F. to 550 degrees F. in the presence of from 0.25% to 2% of a cyclic unsaturated ketone containing at least one but not more than two hemiquinoid groups as the sole reactive centers thereof with an unpolymerized, non-oxidized, unsaturated mixed drying oil composition from the group consisting of unsaturated drying oil fatty acids, polyhydric alcohol esters of drying oil fatty acids and polyhydric alcohol polycarboxylic acid esters of drying oil fatty acids, said acid constituents thereof consisting essentially of less than 30% of conjugated fatty acids and less than 90% but more than 40% of essentially monomeric, non-conjugated fatty oil acids and the remaining acid constituents consisting essentially of minor amounts of other drying vegetable seed oil fatty acids, said polymer containing from 5% to 50% by weight of styrene.

4. A copolymer of fluid homogeneous character which comprises the interpolymerization product of styrene with a non-oxidized, essentially monomeric, non-oxidized, unsaturated drying oil fatty acid containing not more than 30% of conjugated fatty acid groups polyester varnish in the presence of from 0.25 to 2% of a cyclic unsaturated ketone selected from the group consisting of anthraquinone, beta-chloro-anthraquinone, retene quinone, hexa-chlorophenol, naphthaquinone, phenanthraquinone, beta-methyl anthraquinone and chloranil, at a temperature within the range of from 325 degrees F. to 550 degrees F., said copolymer containing from 5% to 50% by weight of styrene.

5. A copolymer of fluid homogeneous character which comprises the interpolymerization product of styrene with an oleoresinous varnish in which one of the fatty oil acids is linoleic and comprises more than 22% of the fatty acid components and another fatty acid is linolenic acid and is less than 45% of the fatty acid component and the remainder of the fatty acid component may be varied up to 30% of a conjugated triene fatty acid, said copolymer containing from 5% to 50% by weight of styrene and the interpolymerization between said reactants being effected by the presence of from 0.25% to 2% of a cyclic unsaturated ketone containing at least one but not more than two hemiquinoid groups as the sole reactive centers thereof at temperatures from 325 degrees F. to 550 degrees F.

6. A process for producing a fluid homogeneous copolymer which consists essentially of interpolymerizing a quantity of a monomeric vinyl compound containing a single polymerizable

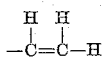

group with a quantity of an oleoresinous varnish containing as a major proportion of the oil component thereof substantially monomeric, non-oxidized, unsaturated fatty oil acid groups of iodine value not less than about 120 of which not more than 30% are conjugated fatty oil acids at temperatures of from 325 degrees F. to 550 degrees F. in the presence of catalytic quantities of a cyclic unsaturated ketone containing at least one but not more than two hemiquinoid groups as the sole reactive centers thereof.

7. A copolymer of fluid homogeneous character of an aromatic vinyl compound containing a single polymerizable

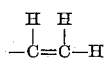

group and an oleoresinous varnish containing as a major proportion of the oil component thereof a substantially monomeric, non-oxidized, unsaturated oil fatty acid groups of iodine value not less than about 120 of which not more than 30% are conjugated fatty oil acids copolymerized at a temperature in the range of 325 degrees F. to 550° degrees F. in the presence of from 0.25% to 2% of a cyclic unsaturated ketone selected frome the group consisting of anthraquinone, beta-chloroanthraquinone, retene quinone, hexachlorophenol, naphtha-quinone, phenanthraquinone, beta-methyl anthraquinone and chloranil the proportion of said vinyl compound being 5% to 50% by weight of said copolymer.

8. A copolymer of fluid homogeneous character of an aromatic vinyl compound containing a single polymerizable

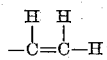

group and an oleoresinous varnish containing as a major proportion of the oil component thereof substantially monomeric, non-oxidized, unsaturated oil fatty acid groups of iodine value not less than about 120 of which not more than 30% are conjugated fatty oil acids copolymerized at a temperature in the range of 325 degrees F. to 550 degrees F. in the presence of from 0.25 to 2% of a cyclic unsaturated ketone containing at least one but not more than two hemiquinoid groups as the sole reactive centers thereof.

9. A process for producing a fluid homogeneous copolymer which consists essentially of interpolymerizing a quantity of a monomeric vinyl compound containing a single polymerizable

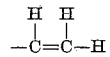

group with a quantity of an oleoresinous varnish containing as a major proportion of the oil component thereof substantially monomeric, non-oxidized unsaturated fatty oil acid groups of iodine value not less than 120 of which not more than 30% are conjugated fatty acids at temperatures of from 325 degrees F. to 550 degrees F. in the presence of catalytic quantities of a cyclic unsaturated ketone selected from the group consisting of anthraquinone, beta-chloroanthraquinone, retene quinone, hexachlorophenol, naphthaquinone, phenanthraquinone, beta-methyl anthraquinone and chloranil, the proportion of said vinyl compound being from 5% to 50% by weight of said copolymer.

10. A liquid coating composition capable of drying under aerobic conditions to form a solid film comprising the copolymer defined in claim 8.

References Cited in the file of this patent

UNITED STATES PATENTS

| Number | Name | Date |
|---|---|---|
| 2,392,710 | Wakeford et al. | Jan. 8, 1946 |
| 2,395,504 | Rubens et al. | Feb. 26, 1946 |
| 2,468,748 | Griess et al. | May 3, 1949 |
| 2,550,114 | Foster | Apr. 24, 1951 |

OTHER REFERENCES

Milas: Proc. Nat. Acad. Sc. Wash., 14, 844–49 (1928).

Fieser and Fieser, Organic Chemistry (Heath and Co.), 1950, page 751.